US012539770B2

(12) United States Patent
Xu et al.

(10) Patent No.: US 12,539,770 B2
(45) Date of Patent: Feb. 3, 2026

(54) METHOD AND APPARATUS FOR CONTROLLING HEATING OF ELECTRIC DRIVE SYSTEM OF VEHICLE, HEATING SYSTEM, AND VEHICLE

(71) Applicant: BYD COMPANY LIMITED, Guangdong (CN)

(72) Inventors: Luhui Xu, Shenzhen (CN); Xiangshuai Xu, Shenzhen (CN); Shaopeng Ren, Shenzhen (CN); Zhiyong Du, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 137 days.

(21) Appl. No.: 18/524,970

(22) Filed: Nov. 30, 2023

(65) Prior Publication Data

US 2024/0092184 A1 Mar. 21, 2024

Related U.S. Application Data

(63) Continuation of application No. PCT/CN2022/122450, filed on Sep. 29, 2022.

(30) Foreign Application Priority Data

Sep. 29, 2021 (CN) .......................... 202111153776.3

(51) Int. Cl.
*B60L 15/20* (2006.01)

(52) U.S. Cl.
CPC ......... *B60L 15/20* (2013.01); *B60L 2240/421* (2013.01); *B60L 2240/423* (2013.01); *B60L 2240/425* (2013.01)

(58) Field of Classification Search
CPC ............... B60L 15/20; B60L 2240/421; B60L 2240/423; B60L 2240/425
See application file for complete search history.

(56) References Cited

U.S. PATENT DOCUMENTS 6,446,745 B1 * 9/2002 Lee .......................... B62M 6/65 180/220
8,138,712 B2 * 3/2012 Yamada .................. H02P 27/10 318/434

(Continued)

FOREIGN PATENT DOCUMENTS

CN 102627073 A 8/2012
CN 105916712 A 8/2016

(Continued)

OTHER PUBLICATIONS

International Search Report and Written Opinion for Application No. PCT/CN2022/122450, mailed on Dec. 16, 2022, 11 pages.

(Continued)

*Primary Examiner* — Gertrude Arthur Jeanglaude
(74) *Attorney, Agent, or Firm* — Sheppard Mullin Richter & Hampton LLP

(57) ABSTRACT

A method for controlling heating of an electric drive system of a vehicle, the electric drive system includes a motor controller and a motor, and the method includes: determining that the vehicle is in a travelling state; obtaining a rotation speed value and a torque control value of a motor and obtaining a carrier instruction value of a motor controller when receiving a heating instruction; obtaining a first current instruction value based on the rotation speed value and the torque control value, and obtaining a second current instruction value based on the torque control value and the first current instruction value; adjusting a control signal of the motor controller based on at least one of the second current instruction value or a second carrier frequency; and controlling the motor to operate based on the adjusted control signal, so that the electric drive system generates heat.

20 Claims, 9 Drawing Sheets

S1: It is determined that a vehicle is in a travelling state

S2: A rotation speed value and a torque control value of a motor and a carrier instruction value of a motor controller are obtained in response to receiving a heating instruction S3: A first current instruction value is obtained based on the rotation speed value and the torque control value, and a second current instruction value is obtained based on the torque control value and the first current instruction value S4: A control signal of the motor controller is adjusted based on at least one of the second current instruction value and a second carrier frequency S5: The motor is controlled to operate based on the adjusted control signal, so that an electric drive system generates heat

(56) References Cited

U.S. PATENT DOCUMENTS

| | | | | |
|---|---|---|---|---|
| 8,901,861 | B2 * | 12/2014 | Luke | H02J 7/007 318/370 |
| 9,709,444 | B2 * | 7/2017 | Nozawa | B60W 20/50 |
| 2012/0200241 | A1 * | 8/2012 | Kojima | B60L 58/25 318/139 |
| 2013/0066501 | A1 * | 3/2013 | Oyama | B62D 6/08 701/22 |
| 2016/0332503 | A1 | 11/2016 | Hirano et al. | |
| 2020/0231135 | A1 | 7/2020 | Ito et al. | |
| 2022/0000241 | A1 | 1/2022 | Wang et al. | |

FOREIGN PATENT DOCUMENTS

| | | | |
|---|---|---|---|
| CN | 111354999 | A | 6/2020 |
| CN | 111546904 | A | 8/2020 |
| CN | 112003502 | A | 11/2020 |
| CN | 112644339 | A | 4/2021 |
| CN | 112721739 | A | 4/2021 |
| CN | 112977094 | A | 6/2021 |
| CN | 113022326 | A | 6/2021 |
| DE | 102017223114 | A1 | 6/2019 |
| JP | 2014-108682 | A | 6/2014 |
| JP | 2018-188112 | A | 11/2018 |
| KR | 20200090723 | A | 7/2020 |

OTHER PUBLICATIONS

First Office Action and Search Report dated Jul. 12, 2024, issued in related Chinese Patent Application No. 202111153776.3, with English machine translation (16 pages).

Extended European Search Report dated Aug. 30, 2024, issued in related European Patent Application No. 22875050.1 (11 pages).

Examination Report No. 1 dated Nov. 22, 2024, issued in related Australian Patent Application No. 2022357035 (3 pages).

Notice of Reasons for Refusal dated Jan. 7, 2025, issued in related Japanese Patent Application No. 2023-569601, with English machine translation (12 pages).

Request for the Submission of an Opinion dated Mar. 12, 2025, issued in related Korean Patent Application No. 10-2023-7040450, English machine translation only (11 pages).

* cited by examiner

METHOD AND APPARATUS FOR CONTROLLING HEATING OF ELECTRIC DRIVE SYSTEM OF VEHICLE, HEATING SYSTEM, AND VEHICLE

CROSS-REFERENCE TO RELATED APPLICATIONS

This application is a Continuation application of International Patent Application No. PCT/CN2022/122450, filed on Sep. 29, 2022, which is based on and claims priority to and benefits of Chinese Patent Application No. 202111153776.3, filed on Sep. 29, 2021. The entire content of all of the above-referenced applications is incorporated herein by reference.

FIELD

The present disclosure relates to a method and an apparatus for controlling heating of an electric drive system of a vehicle, a heating system, and a vehicle.

BACKGROUND

In the related art, an independent heating device such as a positive temperature coefficient (PTC) heater is arranged in an electric vehicle. The heating device provides heat to a power battery by heating a liquid medium in a heat sink, so that a battery can quickly heat up and reach a temperature range of a normal operation, thereby ensuring driving capability of an electric vehicle drive system or charging capability of a charging system.

In the related art, when the independent heating device is configured to heat the power battery or an interior of a carriage, the heating efficiency is relatively low, the heating is not energy-saving, and the cost of parts is relatively high, which is limited by a volume space of the vehicle and a mounting manner is not flexible.

SUMMARY

The present disclosure is to resolve at least one of the technical problems existing in the related art. In view of the above, a first aspect of the present disclosure is to provide a method for controlling heating of an electric drive system of a vehicle. In a normal travelling state of the vehicle, a power battery and an interior of a carriage are heated by the drive system, which reduces costs without arranging an independent heating device, and can improve heating efficiency of the power battery.

A second aspect of the present disclosure is to provide an apparatus for controlling heating of an electric drive system of a vehicle.

A third aspect of the present disclosure is to provide a vehicle heating system.

A fourth aspect of the present disclosure is to provide a vehicle.

An embodiment of a first aspect of the present disclosure provides a method for controlling heating of an electric drive system of a vehicle. The electric drive system includes a motor controller and a motor. The method includes determining that a vehicle is in a travelling state. In response to receiving a heating instruction, obtaining a rotation speed value and a torque control value of the motor and obtaining a carrier instruction value of the motor controller; obtaining a first current instruction value based on the rotation speed value and the torque control value, and obtaining a second current instruction value based on the torque control value and the first current instruction value, where a first amplitude of the second current instruction value is greater than a second amplitude of the first current instruction value, or obtaining a first carrier frequency based on the carrier instruction value, and obtaining a second carrier frequency based on the first carrier frequency, where the second carrier frequency is greater than the first carrier frequency; adjusting a control signal of the motor controller based on at least one of the second current instruction value or the second carrier frequency; and controlling the motor to operate based on the adjusted control signal, so that the electric drive system generates heat.

According to the method for controlling heating of a vehicle electric drive system in an embodiment of the present disclosure, in a case that the vehicle is in a normal travelling state, when a heating demand exists for the power battery, the second current instruction value and the second carrier frequency are obtained based on the rotation speed value, the torque control value, and the carrier instruction value of the motor controller, and a control signal of the motor controller is adjusted based on at least one of the second current instruction value or the second carrier frequency to adjust an operation of the motor, so that the electric drive system generates heat. That is to say, in the normal travelling state, the vehicle can release a large amount of heat by controlling the electric drive system to operate in a high-loss state to function as a heater, which can heat the power battery and the interior of the carriage, and an additional heating device is not required, thereby improving heating efficiency of the power battery.

In some embodiments of the present disclosure, the obtaining a first current instruction value based on the rotation speed value and the torque control value includes: obtaining a heating demand parameter value based on the heating instruction, where the heating demand parameter value includes a heating current value or a heating power value; obtaining a rotation speed correction value based on the heating demand parameter value; obtaining a rotation speed reference value based on the rotation speed correction value and the rotation speed value; querying a travelling current instruction profile table based on the rotation speed reference value, to determine a target travelling current instruction profile; and obtaining the first current instruction value based on the torque control value and the target travelling current instruction profile.

In some embodiments of the present disclosure, the obtaining a rotation speed correction value based on the heating demand parameter value includes: calculating the rotation speed correction value based on the following formula: $\Delta n=k*Is$, where $\Delta n$ is the rotation speed correction value, k is a calibration value, and Is is the heating demand parameter value.

In some embodiments of the present disclosure, the obtaining a second current instruction value based on the torque control value and the first current instruction value includes: keeping the torque control value unchanged, querying the travelling current instruction profile table, and obtaining a current instruction value having an amplitude greater than the first amplitude of the first current instruction value as the second current instruction value.

In some embodiments of the present disclosure, the second current instruction value includes a first d-axis current and a first q-axis current; and the adjusting a control signal of the motor controller based on at least one of the second current instruction value or the second carrier frequency includes: converting the first d-axis current and the first q-axis current to obtain a three-phase driving voltage signal; and performing pulse width modulation on the three-phase driving voltage signal based on the first carrier frequency, to obtain a pulse width modulation signal for driving the motor controller.

In some embodiments of the present disclosure, the second current instruction value includes a first d-axis current and a first q-axis current; and the adjusting a control signal of the motor controller based on at least one of the second current instruction value or the second carrier frequency includes: converting the first d-axis current and the first q-axis current to obtain a three-phase driving voltage signal; and performing pulse width modulation on the three-phase driving voltage signal based on the second carrier frequency, to obtain a pulse width modulation signal for driving the motor controller.

In some embodiments of the present disclosure, the first current instruction value includes a second d-axis current and a second q-axis current; and the adjusting a control signal of the motor controller based on at least one of the second current instruction value or the second carrier frequency includes: converting the second d-axis current and the second q-axis current to obtain a three-phase driving voltage signal; and performing pulse width modulation on the three-phase driving voltage signal based on the second carrier frequency, to obtain a pulse width modulation signal for driving the motor controller.

The apparatus for controlling heating of a vehicle electric drive system in an embodiment of a second aspect of the present disclosure includes: a determining module, configured to determine that a vehicle is in a travelling state; a parameter obtaining module, configured to obtain a rotation speed value and a torque control value of a motor and obtain a carrier instruction value of the motor controller in response to a heating instruction; a heating controllable instruction value obtaining module, configured to obtain a first current instruction value based on the rotation speed value and the torque control value, and obtain a second current instruction value based on the torque control value and the first current instruction value, where an amplitude of the second current instruction value is greater than an amplitude of the first current instruction value, and/or obtain a first carrier frequency based on the carrier instruction value, and obtain a second carrier frequency based on the first carrier frequency, where the second carrier frequency is greater than the first carrier frequency; a control signal obtaining module, configured to adjust a control signal of the motor controller based on at least one of the second current instruction value and the second carrier frequency; and a control module, configured to control the motor to operate based on the control signal, so that the electric drive system generates heat.

According to the apparatus for controlling heating of a vehicle electric drive system in an embodiment of the present disclosure, based on an architecture of the determining module, the parameter obtaining module, the heating controllable instruction value obtaining module, the control signal obtaining module, and the control module, in a case that the vehicle is in a normal travelling state, when a heating demand exists for the power battery, the apparatus for controlling heating of a vehicle electric drive system obtains the second current instruction value and the second carrier frequency based on the rotation speed value, the torque control value, and the carrier instruction value of the motor controller, and a control signal of the motor controller is adjusted based on at least one of the second current instruction value or the second carrier frequency to control an operation of the motor. As a result, the electric drive system runs in a high-loss state and can release a large amount of heat to heat the power battery and the interior of the carriage, and an additional heating device is not required, thereby improving heating efficiency of the power battery.

An embodiment of a third aspect of the present disclosure provides a vehicle heating system. The system includes: an electric drive system, including a motor controller and a motor; a heat exchange system, configured to absorb heat generated by the electric drive system; and an electric drive control apparatus, connected to the electric drive system and configured to control the electric drive system based on the method for controlling heating of an electric drive system of a vehicle according to any of claims, to generate heat.

According to the vehicle heating system in an embodiment of the present disclosure, based on an architecture of an original electric drive system and heat exchange system, by arranging the electric drive control apparatus, the control signal of the motor controller is adjusted in response to the received heating instruction, and the operation of the motor is controlled based on the adjusted control signal in the travelling state of the vehicle, so that the electric drive system generates a large amount of heat to heat a heat dissipation medium in the electric drive system. The heat dissipation medium exchanges heat with the heat exchange system, and the heat exchange system can obtain the heat generated by the electric drive system to heat the power battery and/or the interior of the carriage. The vehicle heating system does not require an external heating device, which saves costs of parts, saves space volume and is more flexible in mounting, and may also improve the heating efficiency of the power battery.

An embodiment of a fourth aspect of the present disclosure provides a vehicle. The vehicle includes: a power battery; a vehicle controller, configured to send a heating instruction when it is determined that the power battery has a heating demand; and the vehicle heating system according to the embodiment of the third aspect, connected to the vehicle controller and configured to heat the power battery in response to the heating instruction.

According to the vehicle in an embodiment of the present disclosure, in the travelling state, the vehicle controller sends a heating instruction to the vehicle heating system based on the heating demand of the power battery. The vehicle heating system adjusts the control signal of the motor controller in response to the received heating instruction, and controls the operation of the motor based on the adjusted control signal to generate heat in the electric drive system. The electric drive system functions as a heater to heat the power battery, which can be directly realized in the existing hardware deice without requiring the external heating device. In this way, costs of parts are saved, the volume space is saved and the mounting manner is more flexible, and heating efficiency of the power battery may also be improved.

The additional aspects and advantages of the present disclosure will be provided in the following description, some of which will become apparent from the following description or may be learned from practices of the present disclosure.

BRIEF DESCRIPTION OF THE DRAWINGS

The foregoing and/or additional aspects and advantages of the present disclosure will become apparent and easy to understand in the description of the embodiments made with reference to the following accompanying drawings.

DETAILED DESCRIPTION

The embodiments of the present invention are described in detail below, and the embodiments described with reference to accompanying drawings are exemplary.

A method of controlling heating of an electric drive system of a vehicle according to an embodiment of the present disclosure is described below with reference to FIG. 1 to FIG. 9.

Figure 1:
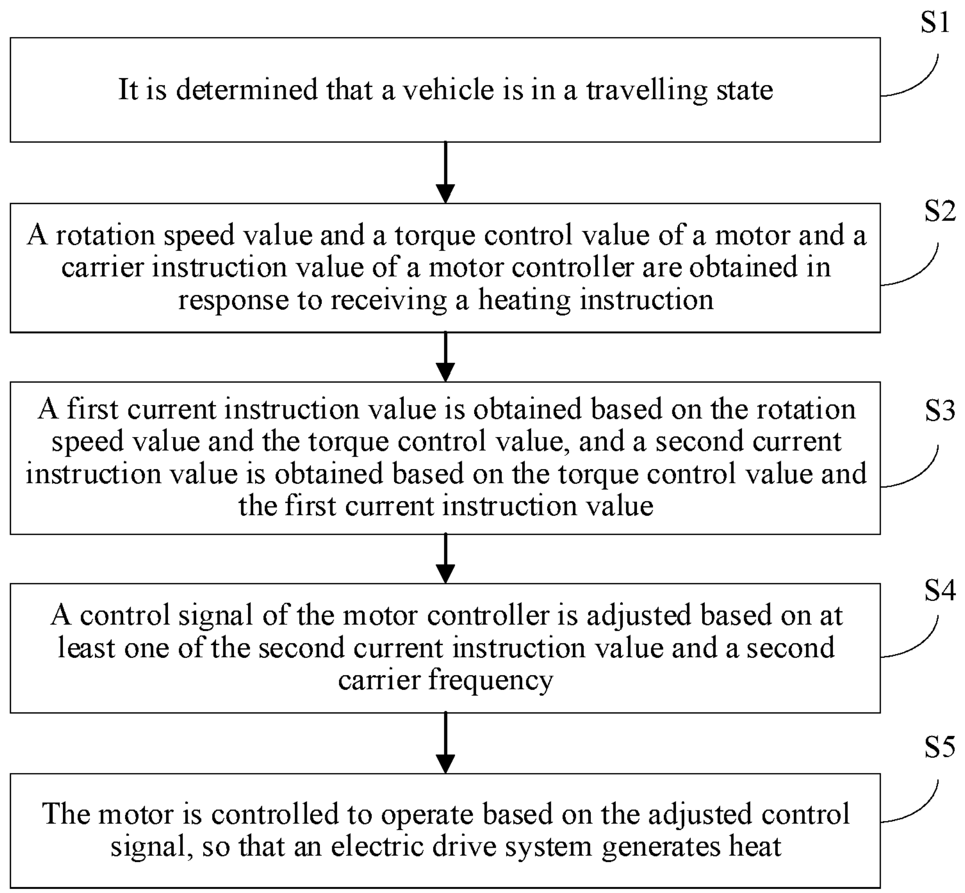
FIG. 1 is a flowchart of a method for controlling heating of an electric drive system of a vehicle according to an embodiment of the present disclosure.

In some embodiments of the present disclosure, FIG. 1 is a flowchart of a method for controlling heating of a vehicle electric drive system according to an embodiment of the present disclosure. The electric drive system includes a motor controller and a motor. The method for controlling heating of an electric drive system of a vehicle includes steps S1-S5, which are as follows.

S1: That a vehicle is in a travelling state is determined.

An apparatus such as a speed sensor and a throttle sensor can be arranged/configured to obtain signal data such as vehicle speed signal and a throttle stamping signal, and that the vehicle is in the travelling state is determined based on the detected signal data.

S2: A rotation speed value and a torque control value of the motor and a carrier instruction value of the motor controller are obtained in response to receiving a heating instruction.

A rotation speed sensor or the like may be arranged at the motor to obtain the rotation speed value of the motor.

In an embodiment, in a case that the vehicle is in the travelling state, when the power battery has a heating demand or a user has a heating demand for a cab, a master computer such as a battery management system (BMS) or a vehicle controller (VCU) of an electric vehicle sends the heating instruction to the electric drive system. The electric drive system obtains the rotation speed value and torque control value of the motor in response to the heating instruction, and obtains the carrier instruction value of the motor controller.

S3: A first current instruction value is obtained based on the rotation speed value and the torque control value, and a second current instruction value is obtained based on the torque control value and the first current instruction value, where an amplitude (e.g., a second amplitude) of the second current instruction value is greater than an amplitude (e.g., a first amplitude) of the first current instruction value, and/or a first carrier frequency is obtained based on the carrier instruction value, and a second carrier frequency is obtained based on the first carrier frequency, where the second carrier frequency is greater than the first carrier frequency.

Figure 2:
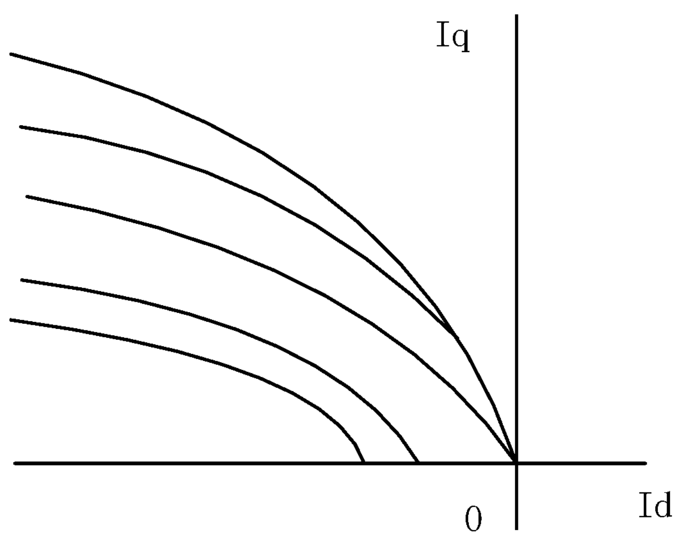
FIG. 2 is a schematic diagram of a current instruction value in a normal travelling state of a vehicle according to some embodiments of the present disclosure.

The first current instruction value is a current instruction value in a normal travelling state of a vehicle, and the second current instruction value is an adjusted current instruction value. FIG. 2 is a schematic diagram of a current command value in a normal travelling state of a vehicle according to some embodiments of the present disclosure. The current instruction value includes a d-axis current and a q-axis current, which are respectively represented by Id and Iq. On the premise that the output torque of the control motor remains unchanged, the amplitude of the second current instruction value can be controlled to be greater than the amplitude of the first current instruction value. By increasing the amplitude of the current instruction value, the electric drive system can be controlled to operate in an inefficient mode with high energy consumption and generate a large amount of heat, thereby realizing heating of the power battery.

Figure 3:
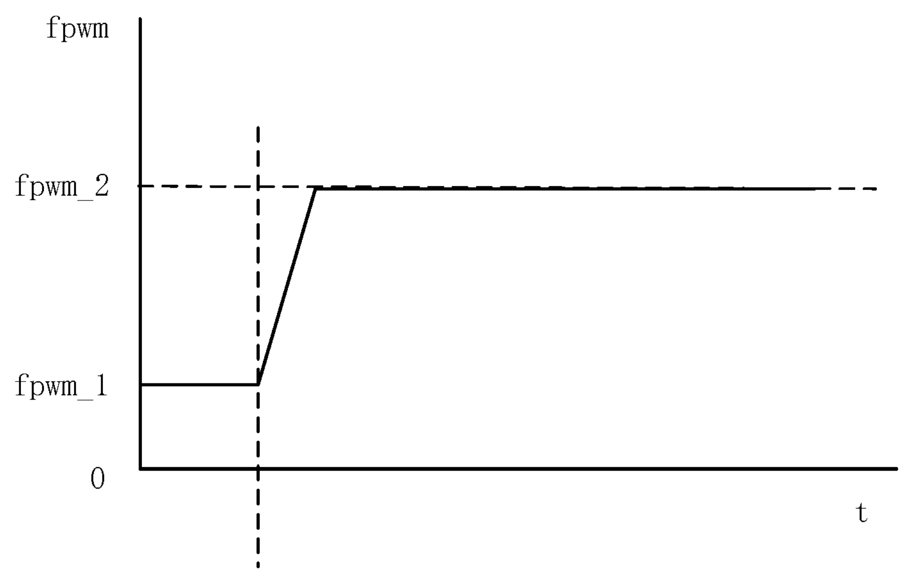
FIG. 3 is a schematic diagram of a relationship between carrier frequency and time according to an embodiment of the present disclosure.

The first carrier frequency is a carrier frequency of the vehicle in the normal travelling state, and the second carrier frequency is the adjusted carrier frequency. The second carrier frequency may be controlled to be greater than the first carrier frequency. The carrier frequency of the vehicle in the normal travelling state uses 5 Hz as an example. The vehicle enters a heating while travelling state from the normal travelling state. The switching frequency of a switching circuit in the motor controller may be increased to increase the carrier frequency. For example, the carrier frequency may be increased from 5 Hz to 15 Hz. FIG. 3 is a schematic diagram of a relationship between carrier frequency and time according to an embodiment of the present disclosure. fpwm_1 represents a first carrier frequency of a vehicle in the normal travelling state. fpwm_2 represents an adjusted second carrier frequency. The second carrier frequency fpwm_2 may be set based on an actual test. The second carrier frequency rate fpwm_2 is greater than the first carrier frequency fpwm_1.

S4: A control signal of the motor controller is adjusted based on at least one of the second current instruction value and a second carrier frequency.

It may be understood that when the vehicle is heated while travelling, the current instruction value in the normal travelling state of the vehicle may not be changed, but the carrier frequency in the normal travelling state of the vehicle may be changed. The control signal of the motor controller is adjusted based on the current instruction value in the normal travelling state of the vehicle and the adjusted carrier frequency. In an embodiment, the carrier frequency in the normal travelling state of the vehicle may not be changed, but the current instruction value in the normal travelling state of the vehicle may be changed. The control signal of the motor controller is adjusted based on the carrier frequency in the normal travelling state of the vehicle and the adjusted current instruction value. In an embodiment, the current instruction value and the carrier frequency in the normal travelling state of the vehicle may be changed at the same time, and the control signal of the motor controller may be adjusted based on the adjusted current instruction value and the carrier frequency.

In an embodiment, a three-phase motor is used as an example. The motor controller may include six switching circuits, which are configured to control an operating state of the three-phase motor. Therefore, the control signal may be a six-way modulation signal and configured to control conduction states of the six switching circuits in the motor controller.

S5: The motor is controlled to operate based on the adjusted control signal, so that the electric drive system generates heat.

The motor may be the three-phase motor. After the motor controller receives the control signal, the motor is driven to operate in an inefficient mode. When the motor operates in the inefficient mode, the electric drive system is in a high-loss state, which can release a large amount of heat, release the heat dissipation medium in the heat heating system, and then convert the heat into the heat required by the vehicle.

The heat directly generated by the electric drive system is heated by the power battery, and a heat transfer efficiency is high, which can cause the power battery heat up quickly and reach a temperature range of normal operation.

According to the method for controlling heating of a vehicle electric drive system in an embodiment of the present disclosure, in a case that the vehicle is in a normal travelling state, when a heating demand exists for the power battery, the second current instruction value and the second carrier frequency are obtained based on the rotation speed value, the torque control value, and the carrier instruction value of the motor controller, and a control signal of the motor controller is adjusted based on at least one of the second current instruction value and the second carrier frequency to adjust an operation of the motor, so that the electric drive system generates heat. That is to say, in the normal travelling state, the vehicle can release a large amount of heat by controlling the electric drive system to operate in a high-loss state to function as a heater, which can heat the power battery and the interior of the carriage, and an additional heating device is not required, thereby improving heating efficiency of the power battery.

Figure 4:
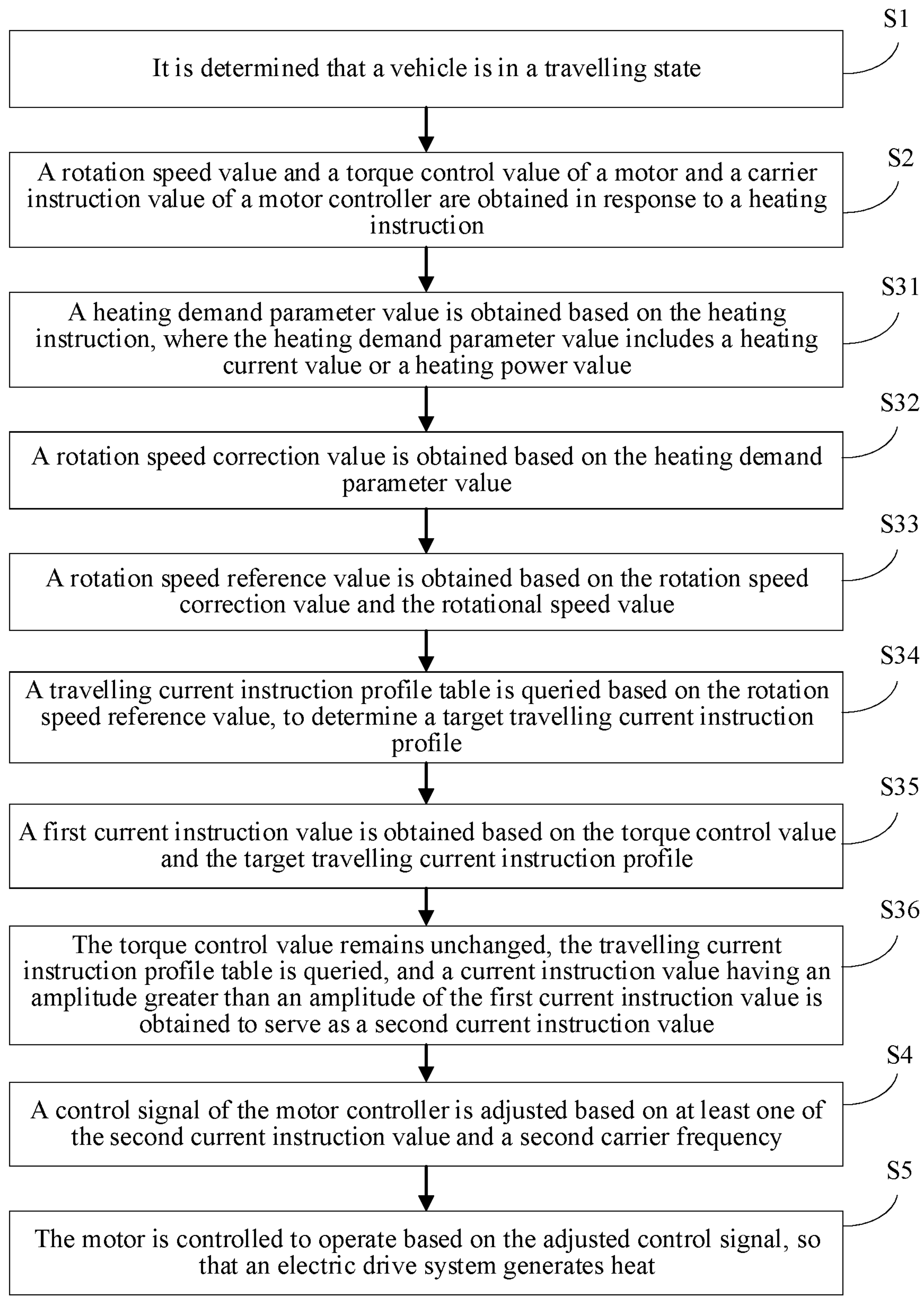
FIG. 4 is a flowchart of a method for controlling heating of an electric drive system of a vehicle according to another embodiment of the present disclosure.

In some embodiments of the present disclosure, FIG. 4 is a flowchart of a method for controlling heating of a vehicle electric drive system according to another embodiment of the present disclosure. In the above step S3, the first current instruction value is obtained based on the rotation speed value and the torque control value, including step S31 to step S35. The obtaining the second current instruction value according to the torque control value and the first current instruction value includes step S36. The method includes the following steps.

S31: A heating demand parameter value is obtained based on the heating instruction, where the heating demand parameter value includes a heating current value or a heating power value.

In an embodiment, when a heating demand exists for the vehicle power battery, the master computer sends a heating instruction. The heating instruction includes the heating demand parameter value, where the heating demand parameter value may be characterized by the heating current value or the heating power value.

S32: A rotation speed correction value is obtained based on the heating demand parameter value.

In an embodiment, the rotation speed correction value can be calculated based on formula (1-1), where $\Delta n$ is the rotation speed correction value, k is a calibration value, and Is is the heating demand parameter value. A magnitude of the k value in formula (1-1) can be calibrated based on an actual bench.

$$\Delta n=k*Is \qquad \text{formula (1-1)}$$

S33: A rotation speed reference value is obtained based on the rotation speed correction value and the rotation speed value.

In an embodiment, when the master computer sends the heating instruction, the vehicle enters the heating while travelling state, and the rotation speed correction value $\Delta n$ is added to the rotation speed value N_cmd of the motor to obtain the rotation speed reference value N_ref.

S34: A travelling current instruction profile table is queried based on the rotation speed reference value, to determine a target travelling current instruction profile.

Figure 5:
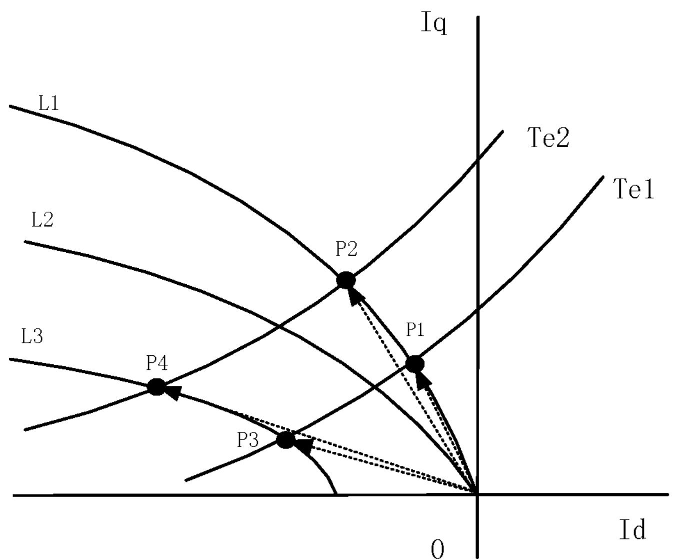
FIG. 5 is a schematic diagram of a travelling current instruction profile table according to an embodiment of the present disclosure.

In an embodiment, FIG. 5 is a schematic diagram of a travelling current instruction profile table according to an embodiment of the present disclosure. Id represents the d-axis current, Iq represents the q-axis current, and the profiles L1, L2, and L3 are all current instruction profiles for a normal travelling and efficient operation of the motor. Profile Te1 and profile Te2 are motor output torque profiles. The current instruction profile is related to the motor speed, that is, L1/L2/L3=f(speed). When the motor speed increases, the current instruction profile sequentially increases from L1, L2, and L3, so that the motor speed is different, and the current instruction profile is different.

In an embodiment, since an output torque of the control motor does not change when the vehicle enters the normal travelling state from the heating while travelling state, the same travelling current instruction profile table can be applied to the vehicle in the heating while travelling state and the normal travelling state of the vehicle. Based on the obtained rotation speed reference value N_ref, the travelling current instruction profile table is queried to determine the target travelling current instruction profile. For example, when the vehicle is in the normal travelling state, the travelling current instruction is on the profile L1. Therefore, after the vehicle enters the heating while travelling state, the travelling current instruction is still on the profile L1, and the profile L1 is the target travelling current instruction profile.

S35: The first current instruction value is obtained based on the torque control value and the target travelling current instruction profile.

In an embodiment, when the vehicle enters the heating while travelling state from the normal travelling state, by increasing the current instruction amplitude, the amount of loss of the electric drive system is increased to enhance heat. The output torque of the motor is controlled to remain unchanged when the vehicle operates in the heating while travelling state, so the travelling current instruction remains unchanged on the travelling current instruction profile, and the first current instruction value is obtained based on the torque control value and the target travelling current instruction profile.

For example, as shown in FIG. 5, when the vehicle is in the normal travelling state and the travelling current instruction is on the profile L1, the output torque of the motor is Te1, the current instruction is p1, and the corresponding coordinates are (Id1, Iq1). Therefore, it is determined that the first current instruction value is p1 (Id1, Iq1). For another example, when the vehicle is in the normal travelling state and the travelling current instruction is on the profile L1, the output torque of the motor is Te2, the current instruction is p2, and the corresponding coordinates are (Id2, Iq2). Therefore, it is determined that the first current instruction value is p2 (Id2, Iq2).

S36: The torque control value remains unchanged, the travelling current instruction profile table is queried, and a current instruction value having an amplitude greater than an amplitude of the first current instruction value is obtained to serve as the second current instruction value.

For example, as shown in FIG. 5, when the vehicle is in the normal travelling state and the output torque of the motor is Te1, the travelling current instruction is on the profile L1. When the first current instruction value is p1 (Id1, Iq1), the current amplitude recorded in this case is Is1. When the vehicle enters the heating while travelling state, the travelling current instruction can slide to the profile L3, the current instruction is p3, and the corresponding coordinates are (Id3, Iq3). Therefore, it is determined that the second current instruction value is p3 (Id3, Iq3). In addition, the current amplitude in this case is denoted as Is3, and Is3>Is1. That is to say, in a case of satisfying that the output torque of the motor is Te1, the amplitude of the current instruction p3 increases.

For example, when the vehicle is in the normal travelling state and the output torque of the motor is Te2, the travelling current instruction is on the profile L1. When the first current instruction value is p2 (Id2, Iq2), the current amplitude recorded in this case is Is22. When the vehicle enters the heating while travelling state, the travelling current instruction can slide to the profile L3, the current instruction is p4, and the corresponding coordinates are (Id4, Iq4). Therefore, it is determined that the second current instruction value is p4 (Id4, Iq4). In addition, the current amplitude in this case is denoted as Is4, and Is4>Is2. That is to say, in a case of satisfying that the output torque of the motor is Te2, the amplitude of the current instruction p4 increases.

In some embodiments of the present disclosure, the second current instruction value includes a first d-axis current and a first q-axis current. When the vehicle is heated while travelling, the first current instruction value in the normal travelling state of the vehicle is increased to the second current instruction value. In a case of satisfying a constant output torque, the current amplitude is increased and the second current instruction value is applied to the electric drive system. That is to say, the second current instruction value is a current instruction that controls an inefficient operation of the electric drive system. The first d-axis current of the second current instruction value is represented by Id low, and the first q-axis current is represented by Iq low.

Figure 6:
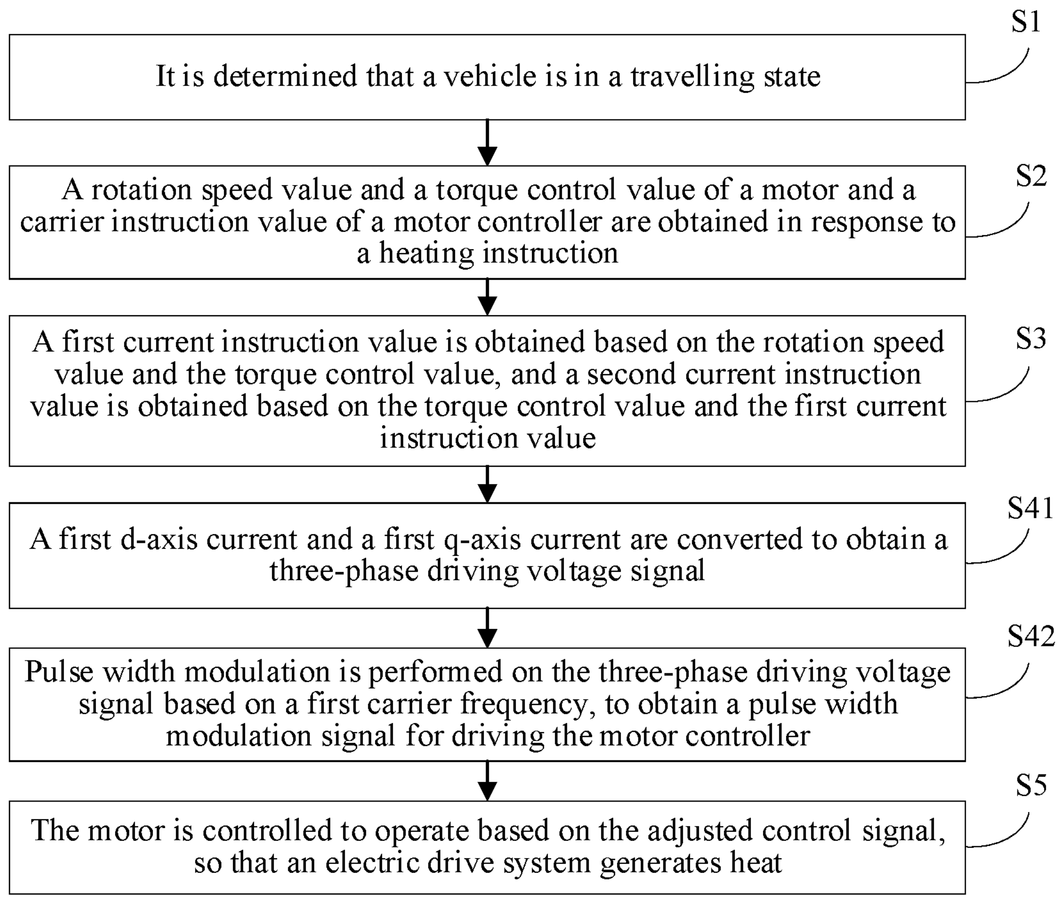
FIG. 6 is a flowchart of a method for controlling heating of an electric drive system of a vehicle according to yet another embodiment of the present disclosure.

FIG. 6 is a flowchart of a method for controlling heating of a vehicle electric drive system according to yet another embodiment of the present disclosure. The control signal of the motor controller is adjusted based on at least one of the second current instruction value and the second carrier frequency, that is, the above step S4 includes step S41 and step S42, which are as follows.

S41: The first d-axis current and the first q-axis current are converted to obtain a three-phase driving voltage signal.

In an embodiment, the motor may include the three-phase motor. The three-phase driving voltage signal is adapted to the three-phase motor. The three-phase driving voltage signal is obtained based on the first d-axis current Id low and the first q-axis current Iq low.

S42: Pulse width modulation is performed on the three-phase driving voltage signal based on the first carrier frequency, to obtain a pulse width modulation signal for driving the motor controller.

In an embodiment, the motor controller is configured to control an operating state of the motor. The three-phase motor is used as an example. The motor controller may include six switching circuits, which are configured to control an operating state of the three-phase motor. The first carrier frequency is the carrier frequency in the normal travelling state of the vehicle. Based on the carrier frequency of the vehicle in the normal travelling state, the frequency of the three-phase driving voltage signal is modulated to obtain the pulse width modulation signal of the drive motor controller. That is to say, when the vehicle is heated while driving, the current instruction value in the normal travelling state of the vehicle may be changed, and the carrier frequency in the normal travelling state of the vehicle may not be changed. The control signal of the motor controller is adjusted based on the adjusted current instruction value and the carrier frequency of the vehicle in the normal travelling state. The pulse width modulation signal may be a six-way modulation signal and configured to control conduction states of the six switching circuits in the motor controller. The second current instruction value and the first carrier frequency are combined and outputted to the motor controller to control the motor to achieve a better heating state.

In some embodiments of the present disclosure, the second current instruction value includes a first d-axis current and a first q-axis current. When the vehicle is heated while travelling, the first current instruction value in the normal travelling state of the vehicle is increased to the second current instruction value. In a case of satisfying a constant output torque, the current amplitude is increased and the second current instruction value is applied to the electric drive system.

Figure 7:
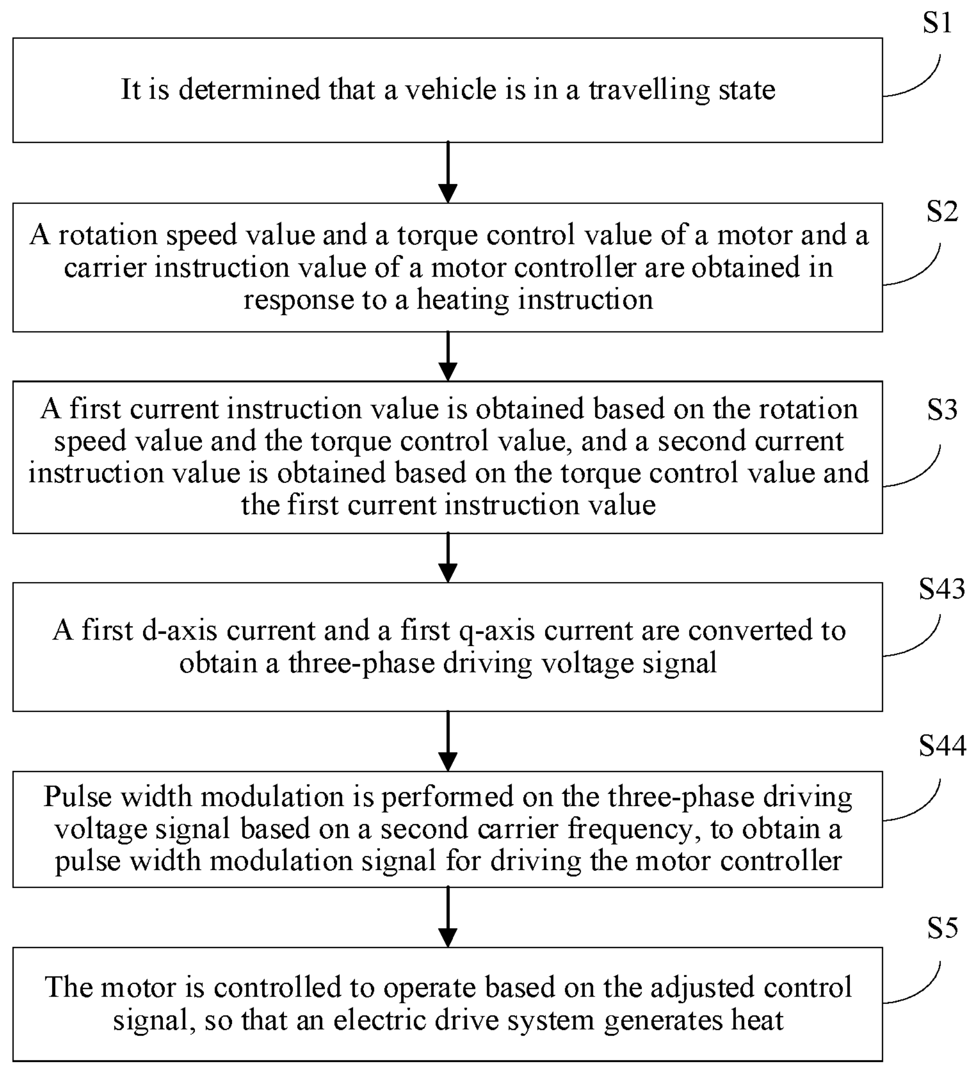
FIG. 7 is a flowchart of a method for controlling heating of an electric drive system of a vehicle according to yet another embodiment of the present disclosure.

FIG. 7 is a flowchart of a method for controlling heating of a vehicle electric drive system according to yet another embodiment of the present disclosure. The control signal of the motor controller is adjusted based on at least one of the second current instruction value and the second carrier frequency, that is, the above step S4 further includes step S43 and step S44, which are as follows.

S43: The first d-axis current and the first q-axis current are converted to obtain a three-phase driving voltage signal.

In an embodiment, the motor is a three-phase motor by way of example. When the vehicle is heated while travelling, the three-phase driving voltage signal is obtained based on the first d-axis current Id low and the first q-axis current Iq low.

S44: Pulse width modulation is performed on the three-phase driving voltage signal based on the second carrier frequency, to obtain a pulse width modulation signal for driving the motor controller.

In an embodiment, a three-phase motor is used as an example. The motor controller may include six switching circuits, which are configured to control an operating state of the three-phase motor. The second carrier frequency is greater than the carrier frequency of the vehicle in the normal travelling state, and the three-phase driving voltage signal is modulated based on the second carrier frequency, to obtain a pulse width modulation signal for driving the motor controller. That is to say, when the vehicle is heated while driving, the current instruction value and the carrier frequency in the normal travelling state of the vehicle may be changed at the same time, and the control signal of the motor controller may be adjusted based on the adjusted current instruction value and the carrier frequency. The pulse width modulation signal may be a six-way modulation signal and configured to control conduction states of the six switching circuits in the motor controller. The second current instruction value and the second carrier frequency are combined and outputted to the motor controller to control the motor to achieve a better heating state.

In some embodiments of the present disclosure, the first current instruction value includes a second d-axis current and a second q-axis current. The current instruction in the normal travelling state of the vehicle is the first current instruction value. When the vehicle enters a travelling heating condition, the first current instruction value can still be applied to the electric drive system in a case that the output torque remains unchanged. The first d-axis current of the first current instruction value is represented by Id ref, and the first q-axis current is represented by Iq ref.

Figure 8:
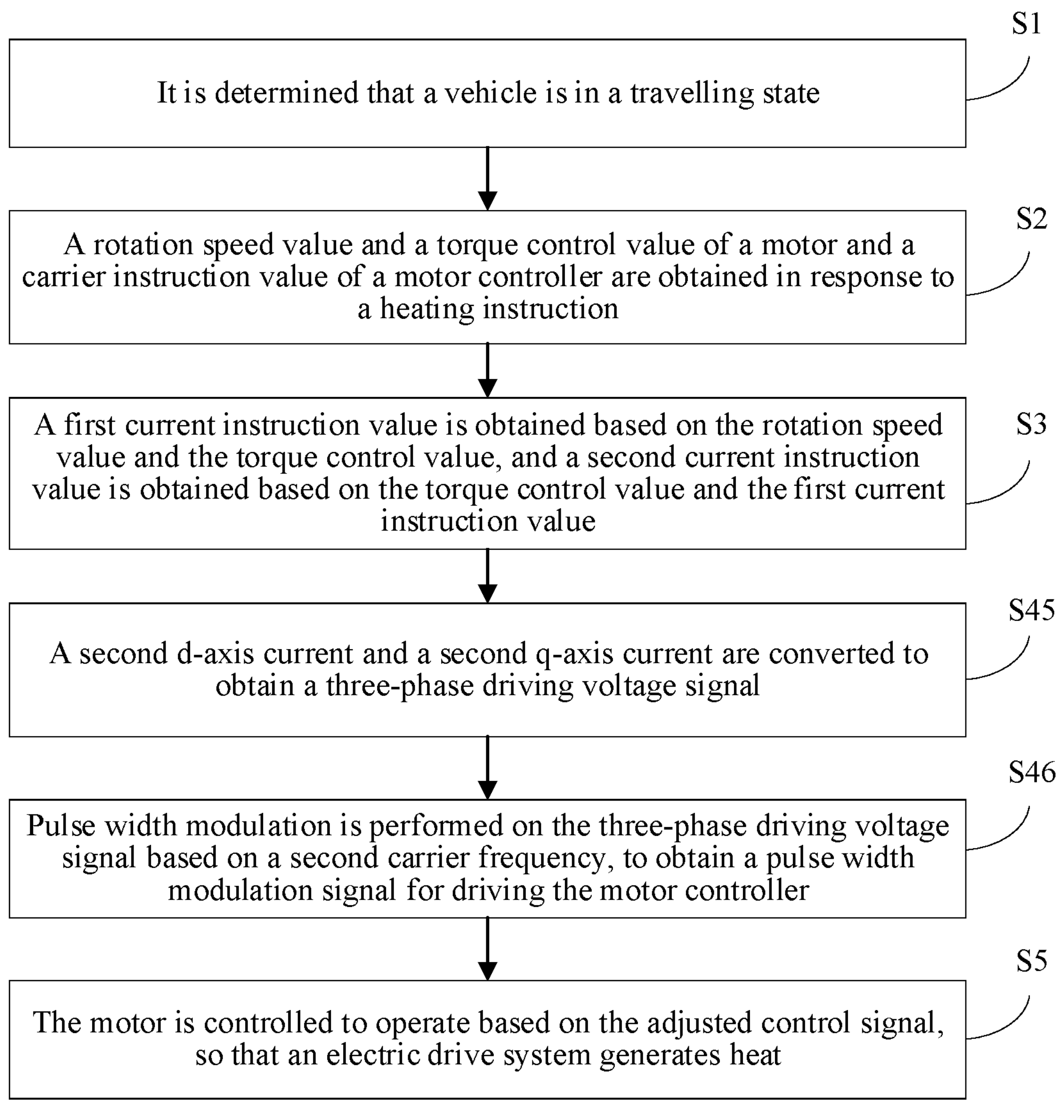
FIG. 8 is a flowchart of a method for controlling heating of an electric drive system of a vehicle according to yet another embodiment of the present disclosure.

FIG. 8 is a flowchart of a method for controlling heating of a vehicle electric drive system according to yet another embodiment of the present disclosure. The control signal of the motor controller is adjusted based on at least one of the second current instruction value and the second carrier frequency, that is, the above step S4 further includes step S45 and step S46, which are as follows.

S45: The second d-axis current and the second q-axis current are converted to obtain a three-phase driving voltage signal.

In an embodiment, the motor may include the three-phase motor. The three-phase driving voltage signal is adapted to the three-phase motor. The three-phase driving voltage signal is obtained based on the first D-axis current Id ref and the first Q-axis current Iq ref.

S46: Pulse width modulation is performed on the three-phase driving voltage signal based on the second carrier frequency, to obtain a pulse width modulation signal for driving the motor controller.

In an embodiment, a three-phase motor is used as an example. The motor controller may include six switching circuits, which are configured to control an operating state of the three-phase motor. The second carrier frequency is greater than the carrier frequency of the vehicle in the normal travelling state, and the three-phase driving voltage signal is modulated based on the second carrier frequency, to obtain a pulse width modulation signal for driving the motor controller. That is to say, when the vehicle is heated while travelling, the current instruction value in the normal travelling state of the vehicle may not be changed, but the carrier frequency in the normal travelling state of the vehicle may be changed. The control signal of the motor controller is adjusted based on the current instruction value in the normal travelling state of the vehicle and the adjusted carrier frequency. The pulse width modulation signal may be a six-way modulation signal and configured to control conduction states of the six switching circuits in the motor controller. The second current instruction value and the second carrier frequency are combined and outputted to the motor controller to control the motor to achieve a better heating state.

According to the method for controlling heating of a vehicle electric drive system in an embodiment of the present disclosure, in the travelling condition of the vehicle, when the heating demand exists for the power battery, the vehicle enters the heating while travelling state from the normal travelling state, and the current instruction value and/or carrier frequency of the vehicle in the normal travelling state can be adjusted accordingly. The control signal of the motor controller is adjusted based on the adjusted current instruction value and/or carrier frequency. As a result, the electric drive system to is controlled operate in a high-loss state to generate a large amount of heat, so as to realize the heating demand for the power battery without requiring arranging the additional heating device, thereby improving heating efficiency of the power battery.

Figure 9:
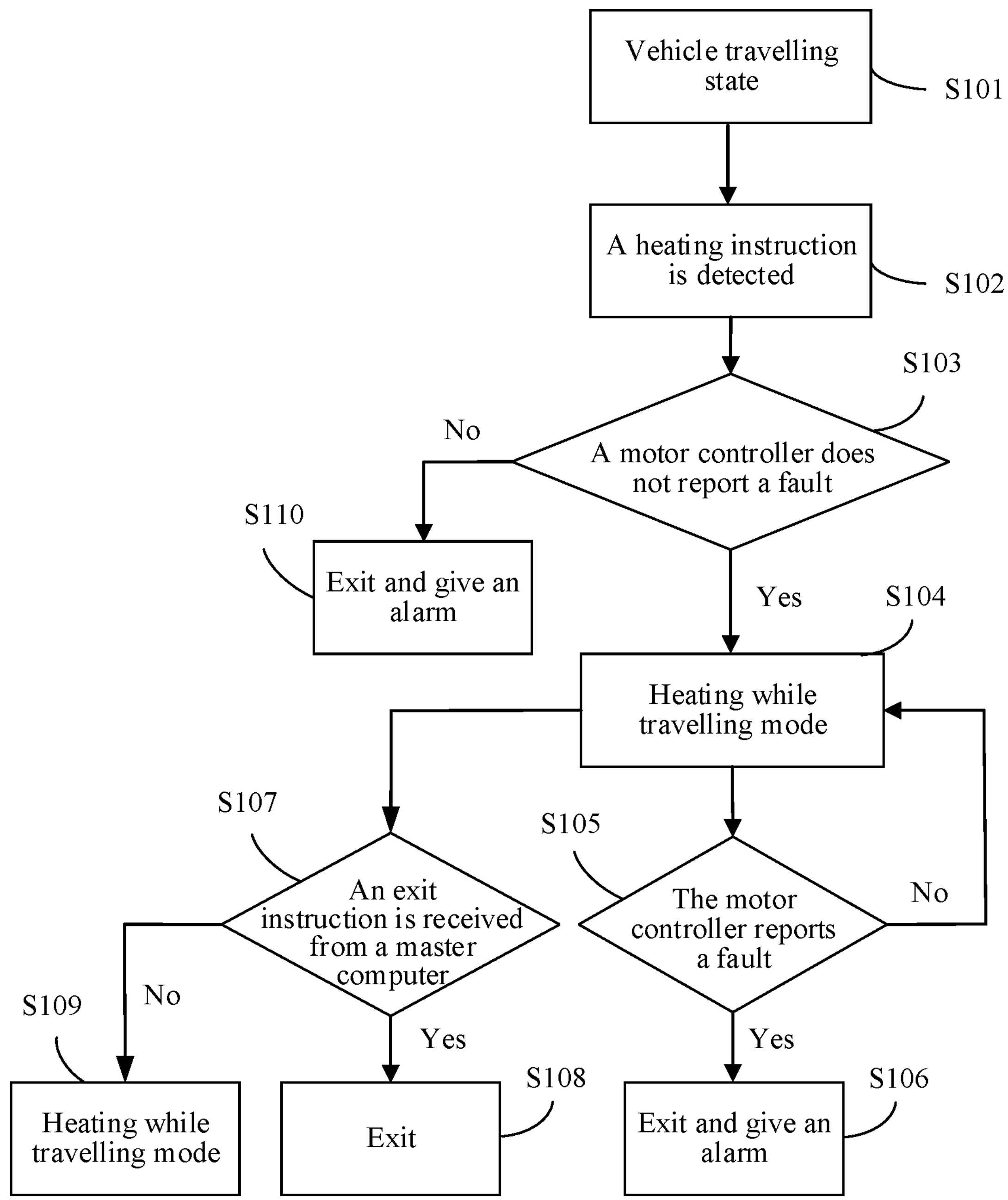
FIG. 9 is a flowchart of a method for controlling heating of an electric drive system of a vehicle according to yet another embodiment of the present disclosure.

In some embodiments of the present disclosure, FIG. 9 is a flowchart of a method for controlling heating of a vehicle electric drive system according to an embodiment of the present disclosure. The method for controlling heating of an electric drive system of a vehicle includes steps S101-S110, which are as follows.

S101: Vehicle travelling state.

S102: The heating instruction is detected.

S103: Whether the motor controller has not reported a fault is determined. When a result of the determination is "Yes", step S104 is performed. Otherwise, step S110 is performed, that is, exit and give an alarm.

S104: The electric drive system operates a heating while travelling mode.

S105: Whether there is a fault reported by the motor controller is determined. When a result of the determination is "Yes", step S106 is performed. Otherwise, step S104 is still performed.

S106: Exit and give an alarm.

S107: Whether an exit instruction is received from the master computer is determined. When a result of the determination is "Yes", step S108 is performed. Otherwise, step S109 is performed.

S108: The heating while travelling mode is exited.

S109: The heating while travelling mode is still operated.

According to the method for controlling heating of a vehicle electric drive system in an embodiment of the present disclosure, when the vehicle is in the travelling state, the power battery or the user has a demand for heating interior of the carriage, the electric drive system is controlled to operate the heating while travelling mode, and the loss of the electric drive system is increased to generate a large amount of heat. The electric drive system functions as the heater, thereby realizing the heating function of the power battery and/or the interior of the carriage in the travelling state of the vehicle.

Figure 10:
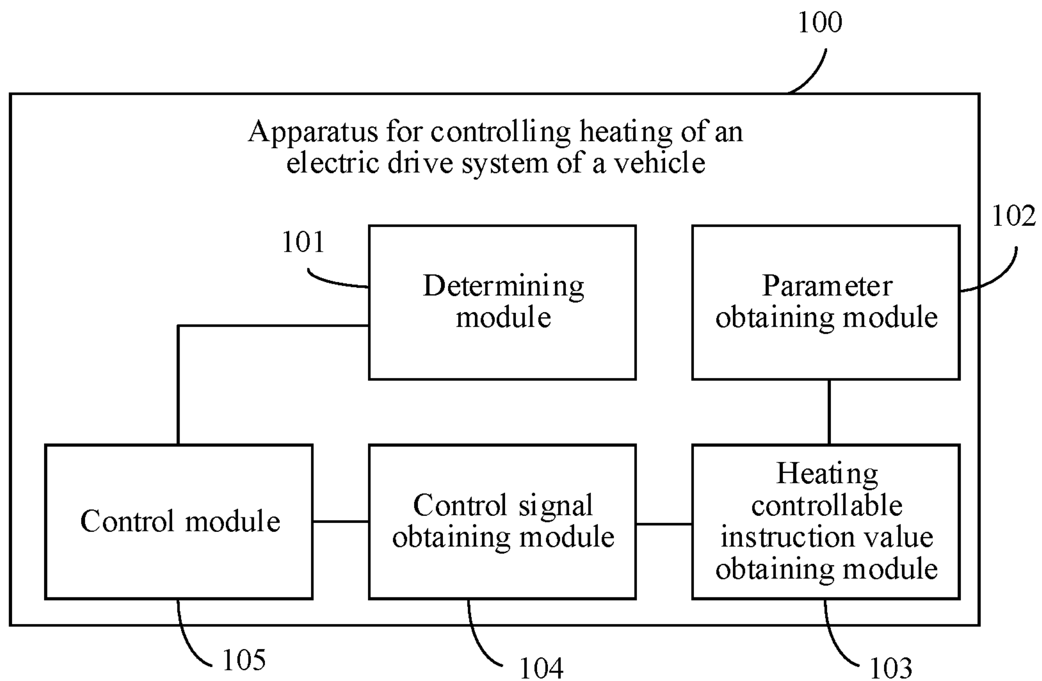
FIG. 10 is a block diagram of an apparatus for controlling heating of an electric drive system of a vehicle according to an embodiment of the present disclosure.

In some embodiments of the present disclosure, FIG. 10 is a block diagram of an apparatus for controlling heating of an electric drive system of a vehicle according to an embodiment of the present disclosure. The apparatus 100 for controlling heating of an electric drive system of a vehicle includes a determining module 101, a parameter obtaining module 102, a heating controllable instruction value obtaining module 103, a control signal obtaining module 104, and a control module 105.

The determining module 101 is configured to determine that a vehicle is in a travelling state. The determining module 101 includes an apparatus such as a speed sensor and a throttle sensor, which can determine that the vehicle is in the travelling state based on the detected signal data by obtaining a speed signal of the vehicle and a throttle stamping signal.

The parameter obtaining module 102 is configured to obtain a rotation speed value and a torque control value of a motor and obtain a carrier instruction value of the motor controller in response to a heating instruction. When a heating demand exists for the vehicle power battery, the master computer sends a heating instruction. The heating instruction includes the heating demand parameter value Is. The parameter obtaining module 102 may include a rotation speed sensor or the like to obtain a rotation speed value N_cmd of the motor. When the vehicle enters the normal travelling state of the vehicle from the heating while travelling state, the output torque of the control motor remains unchanged. Therefore, the torque control value of the vehicle in the normal travelling state and the heating while travelling state Te_cmd unchanged.

The heating controllable instruction value obtaining module 103 is configured to obtain a first current instruction value based on the rotation speed value and the torque control value, and obtain a second current instruction value based on the torque control value and the first current instruction value, where an amplitude of the second current instruction value is greater than an amplitude of the first current instruction value, and/or obtain a first carrier frequency based on the carrier instruction value, and obtain a second carrier frequency based on the first carrier frequency, where the second carrier frequency is greater than the first carrier frequency.

In an embodiment, based on the algorithm shown in formula (1-1), the rotation speed correction value $\Delta n$ is obtained according to the heating demand parameter value Is. Based on the rotation speed value N_cmd of the motor, the rotation speed correction value $\Delta n$, the travelling current instruction profile table and the torque control value Te_cmd, the first current instruction value and the second current instruction value are obtained. The first carrier frequency is obtained based on the carrier instruction value, and the second carrier frequency is obtained based on the first carrier frequency, where the second carrier frequency is greater than the first carrier frequency.

The control signal obtaining module 104 is configured to adjust a control signal of the motor controller based on at least one of the second current instruction value and the second carrier frequency. The control module 105 is configured to control the motor to operate based on the control signal, so that the electric drive system generates heat. The three-phase motor is used as an example. The control signal may be a six-way drive signal.

In an embodiment, in the travelling condition of the vehicle, the vehicle enters the heating while travelling state from the normal travelling state, and the current instruction value and/or carrier frequency of the vehicle in the normal travelling state can be adjusted accordingly. The control signal of the motor controller is adjusted based on the adjusted current instruction value and/or the carrier frequency. The motor controller controls the travelling state of the motor based on the adjusted control signal, thereby controlling the electric drive system to operate in a high-loss state to generate a large amount of heat and realize the heating demand for the power battery.

It should be noted that a specific implementation of the apparatus 100 for controlling heating of a vehicle electric drive system of the embodiment of the present disclosure is similar to a specific implementation of the method for controlling heating of a vehicle electric drive system of the embodiment of the present disclosure. For details, refer to the descriptions of the method. In order to reduce redundancy, details are not described herein again.

According to the apparatus 100 for controlling heating of a vehicle electric drive system in an embodiment of the present disclosure, based on an architecture of the determining module 101, the parameter obtaining module 102, the heating controllable instruction value obtaining module 103, the control signal obtaining module 104, and the control module 105, in a case that the vehicle is in a normal travelling state, when a heating demand exists for the power battery, the apparatus 100 for controlling heating of a vehicle electric drive system obtains the second current instruction value and the second carrier frequency based on the rotation speed value, the torque control value, and the carrier instruction value of the motor controller, and a control signal of the motor controller is adjusted based on at least one of the second current instruction value and the second carrier frequency to control an operation of the motor. As a result, the electric drive system runs in a high-loss state and can release a large amount of heat to heat the power battery and the interior of the carriage, and an additional heating device is not required, thereby improving heating efficiency of the power battery.

Figure 11:
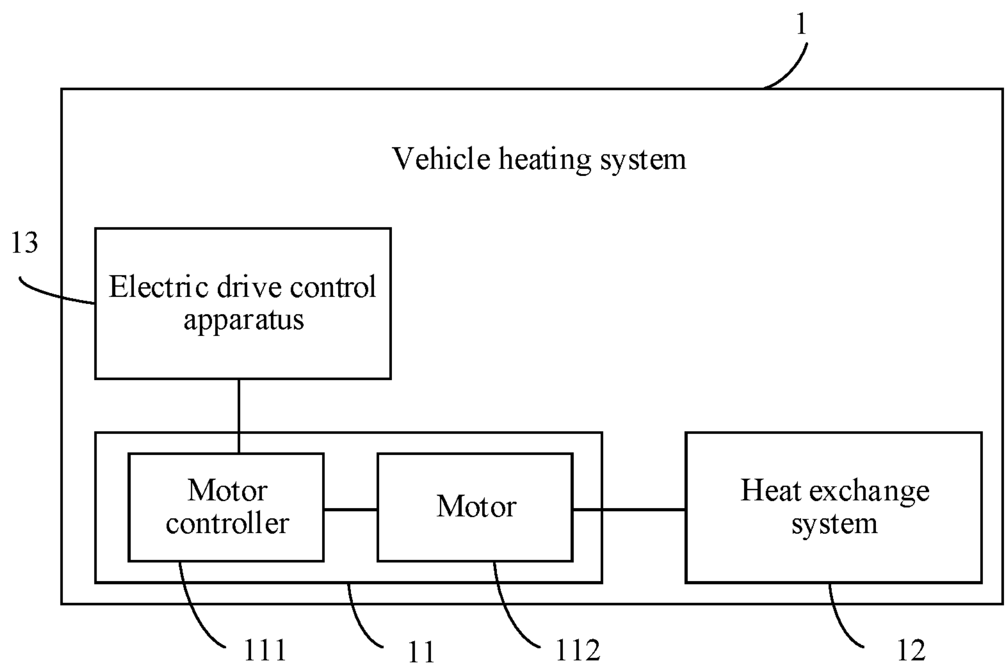
FIG. 11 is a block diagram of a vehicle heating system according to some embodiments of the present disclosure.

In some embodiments of the present disclosure, FIG. 11 is a block diagram of a vehicle heating system according to some embodiments of the present disclosure. The vehicle heating system 1 includes an electric drive system 11, a heat exchange system 12, and an electric drive control apparatus 13. The electric drive system 11 includes a motor controller 111 and a motor 112.

The electric drive control apparatus 13 is connected to the electric drive system 11 and configured to control the electric drive system based on the method for controlling heating of an electric drive system 11 of a vehicle according to any of the embodiments, to generate heat. The heat exchange system 12 is configured to absorb heat generated by the electric drive system 11. The electric drive control apparatus 13 can realize processing and calculation of various parameter signals by software, and can also be integrated into a hardware device including multiple processing elements and modules.

In an embodiment, in a case that the vehicle is in the travelling state, when the power battery has the heating demand or the user has a demand for heating interior of the carriage, the electric drive control apparatus 13 can send the adjusted control signal to the electric drive system 11, thereby increasing the amount of loss of the electric drive system 11 to heat the heat dissipation medium in the electric drive system 11. As a result, the heat generated by the electric drive system 11 is transferred to the heat dissipation medium, and the heat dissipation medium exchanges heat with the heat exchange system 12 in the vehicle, such as a plate changing device. The heat exchange system 12 collects the part of the heat and transfers the heat to the power battery or the interior of the carriage, and while satisfying the power required for the operation of the vehicle, the electric drive system 11 functions as the heater to heat the power battery and the interior of the carriage.

According to the vehicle heating system 1 in an embodiment of the present disclosure, based on an architecture of an original electric drive system 11 and heat exchange system 12, by arranging the electric drive control apparatus 13, the control signal of the motor controller 111 is adjusted in response to the heating instruction, and the operation of the motor 112 is controlled based on the adjusted control signal in the travelling state of the vehicle, so that the electric drive system 11 generates a large amount of heat to heat a heat dissipation medium in the electric drive system 11. The heat dissipation medium exchanges heat with the heat exchange system 12, and the heat exchange system 12 can obtain the heat generated by the electric drive system 11 to heat the power battery and/or the interior of the carriage. The vehicle heating system 1 does not require an external heating device, which saves costs of parts, saves volume space and is more flexible in mounting, and may also improve heating efficiency of the power battery.

Figure 12:
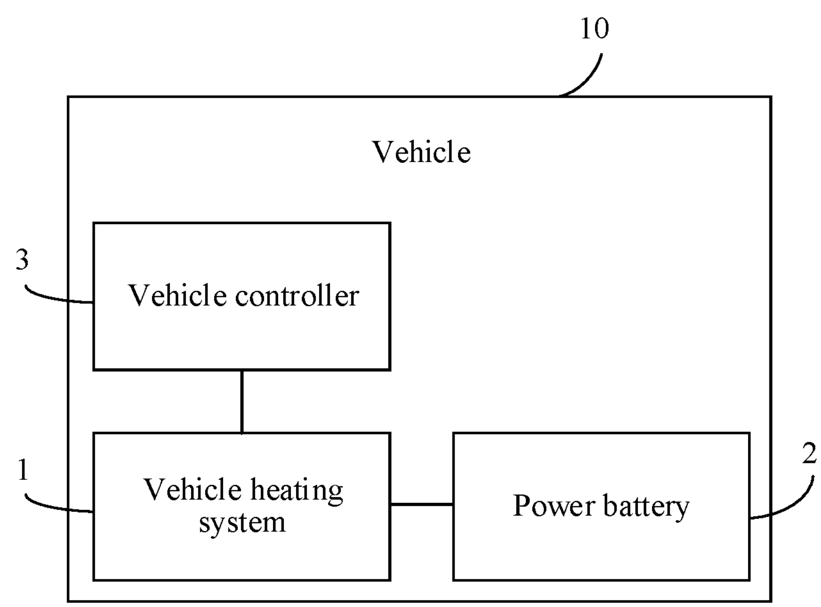
FIG. 12 is a block diagram of a vehicle according to an embodiment of the present disclosure.

In some embodiments of the present disclosure, FIG. 12 is a block diagram of a vehicle according to an embodiment of the present disclosure. The vehicle 10 includes a power battery 2, a vehicle controller 3, and the vehicle heating system 1 according to the embodiment of the third aspect.

The vehicle controller 3 is configured to send a heating instruction when it is determined that the power battery 2 has a heating demand. The vehicle controller 3 is a master computer, which may include a BMS, a VCU, or the like. The vehicle heating system 1 is connected to the vehicle controller 3 and configured to heat the power battery 2 in response to the heating instruction.

In an embodiment, when the heating demand exists for the power battery 2, the vehicle controller 3 sends the heating instruction to the vehicle heating system 1. The vehicle heating system 1 detects that the vehicle 10 is in the travelling state, adjusts the control signal of the motor controller 111 in response to the heating instruction, and controls the motor 112 to operate based on the adjusted control signal to generate heat for the electric drive system 11. By increasing the heat consumption of the electric drive system 11, the heat dissipation medium in the electric drive system 11 is heated. When the heat dissipation medium flows through the power battery 2, heat is transferred to the power battery 2, thereby realizing the function of heating the power battery 2 when the vehicle 10 travels. When the user has a heating demand for the interior of the carriage, a relevant instruction may be sent to the vehicle controller 3. The vehicle controller 3 sends the heating instruction to the vehicle heating system 1 in response to the instruction, so as to control the vehicle heating system 1 to operate based on the method for controlling the heating of the vehicle electric drive system according to any of the above embodiments, so as to supply heat to the interior of the carriage.

According to the vehicle 10 in an embodiment of the present disclosure, in the travelling state, the vehicle controller 3 sends a heating instruction to the vehicle heating system 1 based on the heating demand of the power battery 2. The vehicle heating system 1 adjusts the control signal of the motor controller 111 in response to the heating instruction, and controls the operation of the motor 112 based on the adjusted control signal to generate heat in the electric drive system 11. The electric drive system 11 functions as a heater to heat the power battery 2, which can be directly realized in the existing hardware deice without requiring the external heating device. In this way, costs of parts are saved, the volume space is saved and the mounting manner is more flexible, and heating efficiency of the power battery 2 may also be improved.

Other configurations and operations of the vehicle 10 according to the embodiments of the present invention are known to those of ordinary skill in the art and will not be described in detail herein.

In the description of this specification, the description of the reference terms such as "an embodiment", "some embodiments", "exemplary embodiments", "example", "specific example", or "some examples" means that the specific features, structures, materials, or characteristics described with reference to the embodiment or example are included in at least one embodiment or example of the present disclosure. In the present disclosure, exemplary descriptions of the foregoing terms do not necessarily refer to the same embodiment or example.

Although the embodiments of the present disclosure have been shown and described, a person of ordinary skill in the art should understand that various changes, modifications, replacements, and variations may be made to the embodiments without departing from the principles and spirit of the present disclosure, and the scope of the present disclosure is as defined by the appended claims and their equivalents.

REFERENCE NUMERALS

Vehicle 10;
Vehicle heating system 1, Power battery 2, and Vehicle controller 3;
Electric drive system 11, Heat exchange system 12, and Electric drive control apparatus 13;
Motor controller 111, and Motor 112;
Apparatus 100 for controlling heating of an electric drive system of a vehicle; and
Determining module 101, Parameter obtaining module 102, Heating controllable instruction value obtaining module 103, Control signal obtaining module 104, and Control module 105.

What is claimed is:

1. A method for controlling heating of an electric drive system of a vehicle, wherein the electric drive system comprises a motor controller and a motor, and the method comprises:

determining that the vehicle is in a travelling state;

receiving a heating instruction, wherein the heating instruction comprises a heating demand parameter value, and the heating demand parameter value comprises a heating current value or a heating power value;

in response to the heating instruction, obtaining a rotation speed value and a torque control value of the motor and obtaining a carrier instruction value of the motor controller;

obtaining a first current instruction value based on the rotation speed value and the torque control value, and obtaining a second current instruction value based on the torque control value and the first current instruction value, wherein a second amplitude of the second current instruction value is greater than a first amplitude of the first current instruction value; or obtaining a first carrier frequency based on the carrier instruction value, and obtaining a second carrier frequency based on the first carrier frequency, wherein the second carrier frequency is greater than the first carrier frequency;

adjusting a control signal of the motor controller based on at least one of the second current instruction value or the second carrier frequency; and controlling the motor to operate based on the adjusted control signal, so that the electric drive system generates heat.

2. The method according to claim 1, wherein the obtaining the first current instruction value based on the rotation speed value and the torque control value comprises:

obtaining a rotation speed correction value based on the heating demand parameter value;

obtaining a rotation speed reference value based on the rotation speed correction value and the rotation speed value;

determining a target travelling current instruction profile by querying a travelling current instruction profile table based on the rotation speed reference value; and obtaining the first current instruction value based on the torque control value and the target travelling current instruction profile.

3. The method according to claim 2, wherein the obtaining the rotation speed correction value based on the heating demand parameter value comprises:

calculating the rotation speed correction value based on a formula of:

$$\Delta n = k * Is,$$

wherein Δn is the rotation speed correction value, k is a calibration value, and Is is the heating demand parameter value.

4. The method according to claim 1, wherein the obtaining the second current instruction value based on the torque control value and the first current instruction value comprises:

keeping the torque control value unchanged, querying a travelling current instruction profile table, and obtaining a current instruction value having an amplitude greater than the first amplitude of the first current instruction value as the second current instruction value.

5. The method according to claim 1, wherein the second current instruction value comprises a first d-axis current and a first q-axis current; and the adjusting the control signal of the motor controller based on at least one of the second current instruction value or the second carrier frequency comprises:

obtaining a three-phase driving voltage signal by converting the first d-axis current and the first q-axis current; and obtaining a pulse width modulation signal for driving the motor controller by performing pulse width modulation on the three-phase driving voltage signal based on the first carrier frequency.

6. The method according to claim 1, wherein the second current instruction value comprises a first d-axis current and a first q-axis current; and the adjusting the control signal of the motor controller based on at least one of the second current instruction value or the second carrier frequency comprises:

obtaining a three-phase driving voltage signal by converting the first d-axis current and the first q-axis current; and obtaining a pulse width modulation signal for driving the motor controller by performing pulse width modulation on the three-phase driving voltage signal based on the second carrier frequency.

7. The method according to claim 1, wherein the first current instruction value comprises a second d-axis current and a second q-axis current; and the adjusting the control signal of the motor controller based on at least one of the second current instruction value or the second carrier frequency comprises:

obtaining a three-phase driving voltage signal by converting the second d-axis current and the second q-axis current; and obtaining a pulse width modulation signal for driving the motor controller by performing pulse width modulation on the three-phase driving voltage signal based on the second carrier frequency.

8. A vehicle heating system, comprising:

an electric drive system, comprising a motor controller and a motor;

a heat exchange system, configured to absorb heat generated by the electric drive system; and an electric drive control apparatus, connected to the electric drive system and configured to control the electric drive system to perform operations comprising:

determining that a vehicle is in a travelling state;

receiving a heating instruction, wherein the heating instruction comprises a heating demand parameter value, and the heating demand parameter value comprises a heating current value or a heating power value;

in response to the heating instruction, obtaining a rotation speed value and a torque control value of the motor, and obtaining a carrier instruction value of the motor controller;

obtaining a first current instruction value based on the rotation speed value and the torque control value, and obtaining a second current instruction value based on the torque control value and the first current instruction value, wherein a second amplitude of the second current instruction value is greater than a first amplitude of the first current instruction value; or obtaining a first carrier frequency based on the carrier instruction value, and obtaining a second carrier frequency based on the first carrier frequency, wherein the second carrier frequency is greater than the first carrier frequency;

adjusting a control signal of the motor controller based on at least one of the second current instruction value or the second carrier frequency; and controlling the motor to operate based on the adjusted control signal, so that the electric drive system generates heat.

9. The vehicle heating system according to claim 8, wherein the obtaining the first current instruction value based on the rotation speed value and the torque control value comprises:

obtaining a rotation speed correction value based on the heating demand parameter value;

obtaining a rotation speed reference value based on the rotation speed correction value and the rotation speed value;

determining a target travelling current instruction profile by querying a travelling current instruction profile table based on the rotation speed reference value; and obtaining the first current instruction value based on the torque control value and the target travelling current instruction profile.

10. The vehicle heating system according to claim 9, wherein the obtaining the rotation speed correction value based on the heating demand parameter value comprises:

calculating the rotation speed correction value based on a formula of:

$$\Delta n = k * Is,$$

wherein Δn is the rotation speed correction value, k is a calibration value, and Is is the heating demand parameter value.

11. The vehicle heating system according to claim 8, wherein the obtaining the second current instruction value based on the torque control value and the first current instruction value comprises:

keeping the torque control value unchanged, querying a travelling current instruction profile table, and obtaining a current instruction value having an amplitude greater than the first amplitude of the first current instruction value as the second current instruction value.

12. The vehicle heating system according to claim 8, wherein the second current instruction value comprises a first d-axis current and a first q-axis current; and the adjusting the control signal of the motor controller based on at least one of the second current instruction value or the second carrier frequency comprises:

obtaining a three-phase driving voltage signal by converting the first d-axis current and the first q-axis current; and obtaining a pulse width modulation signal for driving the motor controller by performing pulse width modulation on the three-phase driving voltage signal based on the first carrier frequency.

13. The vehicle heating system according to claim 8, wherein the second current instruction value comprises a first d-axis current and a first q-axis current; and the adjusting the control signal of the motor controller based on at least one of the second current instruction value or the second carrier frequency comprises:

obtaining a three-phase driving voltage signal by converting the first d-axis current and the first q-axis current; and obtaining a pulse width modulation signal for driving the motor controller by performing pulse width modulation on the three-phase driving voltage signal based on the second carrier frequency.

14. The vehicle heating system according to claim 8, wherein the first current instruction value comprises a second d-axis current and a second q-axis current; and the adjusting the control signal of the motor controller based on at least one of the second current instruction value or the second carrier frequency comprises:

obtaining a three-phase driving voltage signal by converting the second d-axis current and the second q-axis current; and obtaining a pulse width modulation signal for driving the motor controller by performing pulse width modulation on the three-phase driving voltage signal based on the second carrier frequency.

15. A vehicle, comprising:

a power battery;

a vehicle controller, configured to send a heating instruction when the power battery has a heating demand; and a vehicle heating system connected to the vehicle controller and configured to heat the power battery in response to the heating instruction, the vehicle heating system comprising:

an electric drive system comprising a motor controller and a motor;

a heat exchange system, configured to absorb heat generated by the electric drive system; and an electric drive control apparatus, connected to the electric drive system and configured to control the electric drive system to perform operations comprising:

determining that the vehicle is in a travelling state;

receiving the heating instruction, wherein the heating instruction comprises a heating demand parameter value, and the heating demand parameter value comprises a heating current value or a heating power value;

in response to the heating instruction, obtaining a rotation speed value and a torque control value of the motor, and obtaining a carrier instruction value of the motor controller;

obtaining a first current instruction value based on the rotation speed value and the torque control value, and obtaining a second current instruction value based on the torque control value and the first current instruction value, wherein a second amplitude of the second current instruction value is greater than a first amplitude of the first current instruction value; or obtaining a first carrier frequency based on the carrier instruction value, and obtaining a second carrier frequency based on the first carrier frequency, wherein the second carrier frequency is greater than the first carrier frequency;

adjusting a control signal of the motor controller based on at least one of the second current instruction value or the second carrier frequency; and controlling the motor to operate based on the adjusted control signal, so that the electric drive system generates heat.

16. The vehicle according to claim 15, wherein the obtaining the first current instruction value based on the rotation speed value and the torque control value comprises:

obtaining a rotation speed correction value based on the heating demand parameter value;

obtaining a rotation speed reference value based on the rotation speed correction value and the rotation speed value;

determining a target travelling current instruction profile by querying a travelling current instruction profile table based on the rotation speed reference value; and obtaining the first current instruction value based on the torque control value and the target travelling current instruction profile.

17. The vehicle according to claim 16, wherein the obtaining the rotation speed correction value based on the heating demand parameter value comprises:

calculating the rotation speed correction value based on a formula of:

$$\Delta n = k * Is,$$

wherein Δn is the rotation speed correction value, k is a calibration value, and Is is the heating demand parameter value.

18. The vehicle according to claim 15, wherein the obtaining the second current instruction value based on the torque control value and the first current instruction value comprises:

keeping the torque control value unchanged, querying a travelling current instruction profile table, and obtaining a current instruction value having an amplitude greater than the first amplitude of the first current instruction value as the second current instruction value.

19. The vehicle according to claim 15, wherein the second current instruction value comprises a first d-axis current and a first q-axis current; and the adjusting the control signal of the motor controller based on at least one of the second current instruction value or the second carrier frequency comprises:

obtaining a three-phase driving voltage signal by converting the first d-axis current and the first q-axis current; and obtaining a pulse width modulation signal for driving the motor controller by performing pulse width modulation on the three-phase driving voltage signal based on the first carrier frequency.

20. The vehicle according to claim 15, wherein the second current instruction value comprises a first d-axis current and a first q-axis current; and the adjusting the control signal of the motor controller based on at least one of the second current instruction value or the second carrier frequency comprises:

obtaining a three-phase driving voltage signal by converting the first d-axis current and the first q-axis current; and obtaining a pulse width modulation signal for driving the motor controller by performing pulse width modulation on the three-phase driving voltage signal based on the second carrier frequency.

* * * * *